March 23, 1937. H. M. KINSLOW 2,074,611
STAPLING MACHINE
Filed July 22, 1935 5 Sheets-Sheet 1

INVENTOR
HENRY M. KINSLOW
BY Lloyd Spencer
ATTORNEY

March 23, 1937.   H. M. KINSLOW   2,074,611
STAPLING MACHINE
Filed July 22, 1935   5 Sheets-Sheet 2
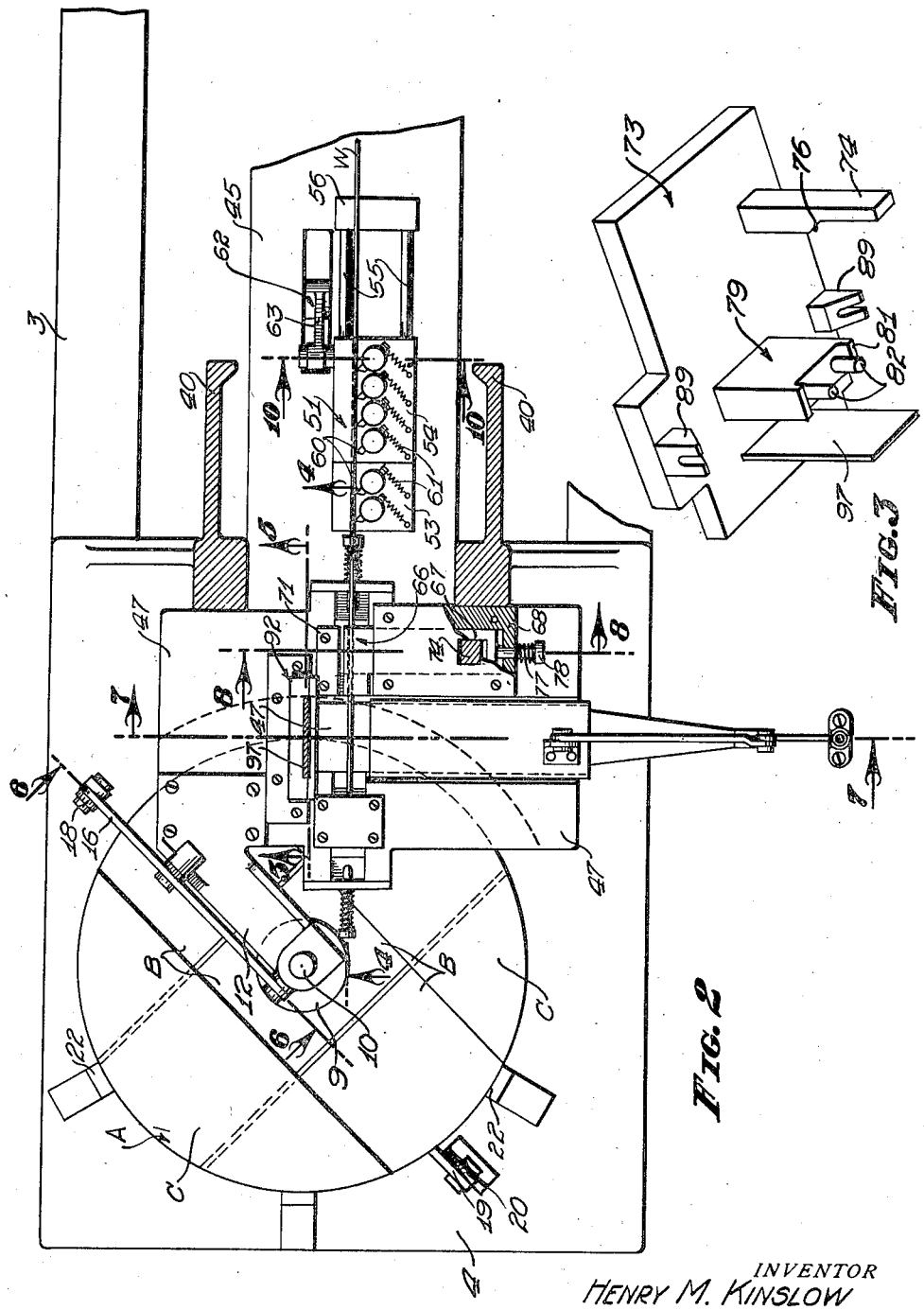
INVENTOR
HENRY M. KINSLOW
BY Lloyd Spencer
ATTORNEY

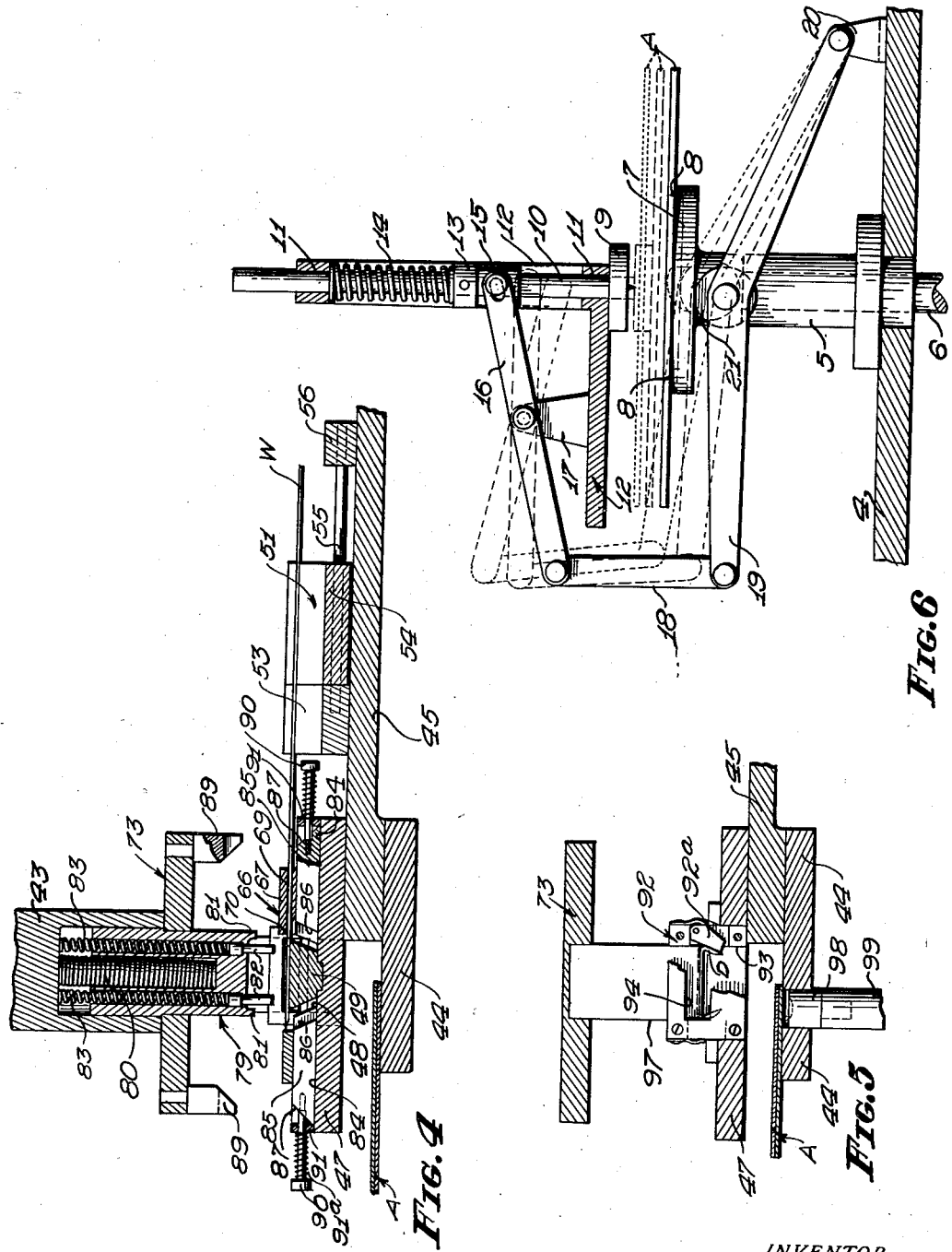

March 23, 1937.  H. M. KINSLOW  2,074,611
STAPLING MACHINE
Filed July 22, 1935  5 Sheets-Sheet 4

INVENTOR
HENRY M. KINSLOW
BY Lloyd Spencer
ATTORNEY

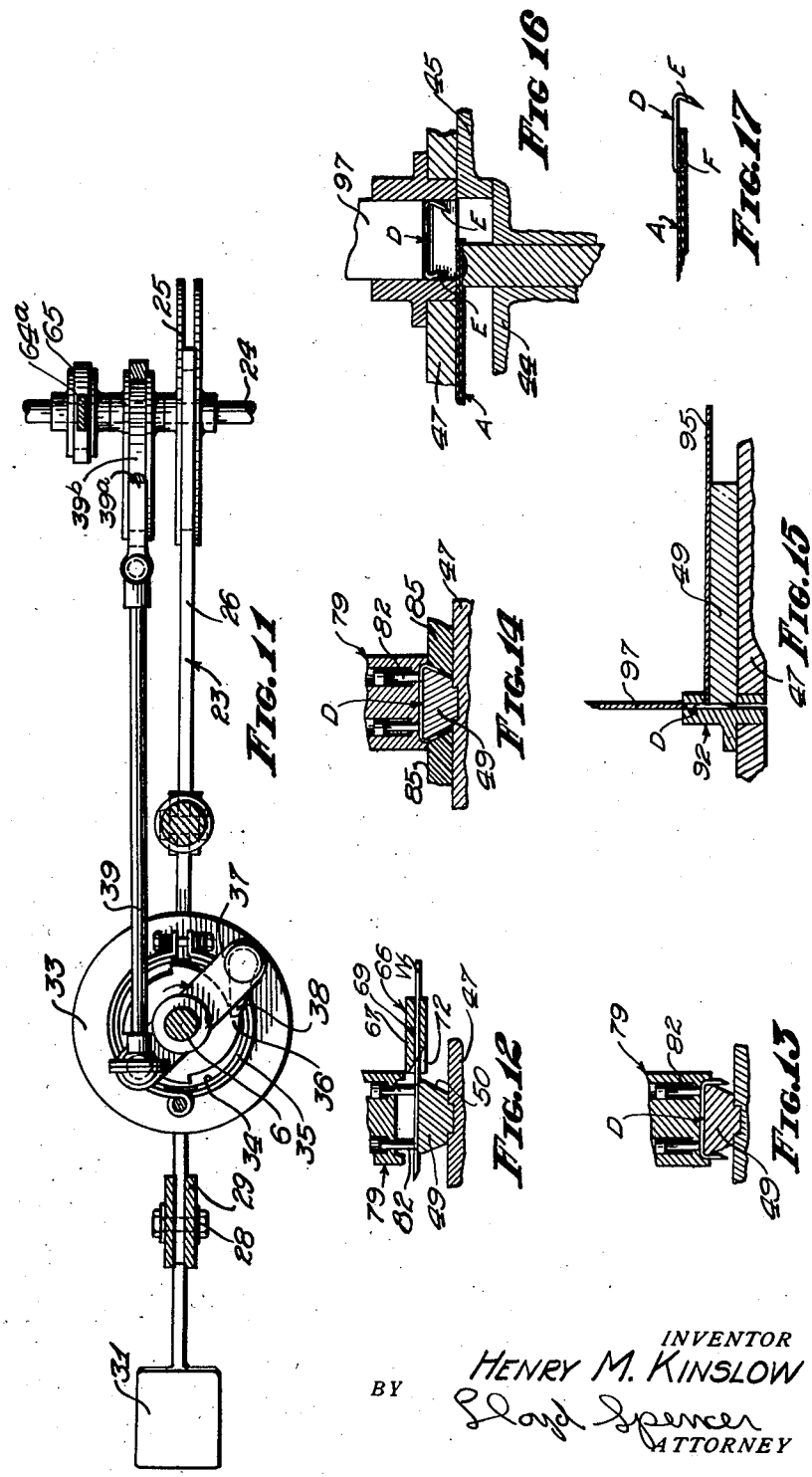

Patented Mar. 23, 1937

2,074,611

UNITED STATES PATENT OFFICE 2,074,611

STAPLING MACHINE

Henry M. Kinslow, Santa Ana, Calif., assignor to San Diego Fruit and Produce Company, San Diego, Calif., a corporation of California Application July 22, 1935, Serial No. 32,521

13 Claims. (Cl. 1—13.6)

My invention relates to stapling machines, more particularly, to a stapling machine which is particularly adapted to form and secure staples in hamper lids such as used in conjunction with the Basket and hamper fastening machine, Patent Number 1,944,254, issued January 23, 1934.

Among the objects of my invention are:

First, to provide a stapling machine of this class which cuts the staple blank from a length of wire, shapes the staple to form two inturned prongs then drives and clinches one prong of the staple in a hamper lid.

Second, to provide a stapling machine of this class which points the extremities of the staple by cutting the wire from which it is formed on a bevel, which is symmetrical with respect to the plane of the staple so that the staple tends to drive straight.

Third, to provide a stapling machine which incorporates a mechanism arranged to hold a hamper lid and turn it arcuately whereby a plurality of staples may be secured radially about its periphery.

Fourth, to provide a stapling machine of this character which is particularly rugged and sturdy of construction and adapted to withstand continuous hard usage.

Fifth, to provide a stapling machine whereby one staple is cut and formed while the previously formed staple is being secured.

Sixth, to provide a stapling machine which is particularly easy to operate and wherein any number of staples may be placed in the hamper lid, or the lid returned to the machine to supply a deficiency in the number of staples should the machine miss.

With these and other objects in view as may appear hereinafter, references are made to the accompanying drawings in which:

Figure 2 is a partially plan partially sectional view thereof on an enlarged scale taken substantially along 2—2 of Fig. 1.

Figure 3 is a perspective bottom view of the operating head which carries the several operating elements.

Figure 4 is a fragmentary longitudinal sectional view taken through 4—4 of Fig. 2 showing particularly the staple cutting and bending mechanism.

Figure 5 is a similar fragmentary longitudinal sectional view taken through 5—5 of Fig. 2 showing particularly the staple driving and clinching mechanism.

Figure 6 is a fragmentary sectional view substantially along the line 6—6 of Fig. 2 illustrating the hamper lid clamping mechanism.

Figure 11 is a partially sectional partially plan view through 11—11 of Fig. 1.

Figure 12 is a fragmentary diagrammatical view illustrating the wire cutting operation.

Figure 13 is a similar view illustrating the initial bending operation of the staple blank.

Figure 14 is a similar view illustrating the completion of the staple forming operation.

Figure 15 is a similar view illustrating the staple positioning operation.

Figure 16 is a similar view illustrating the staple driving operation, and

Figure 17 is a fragmentary sectional view of a hamper lid with a staple shown secured thereto.

Figure 1:
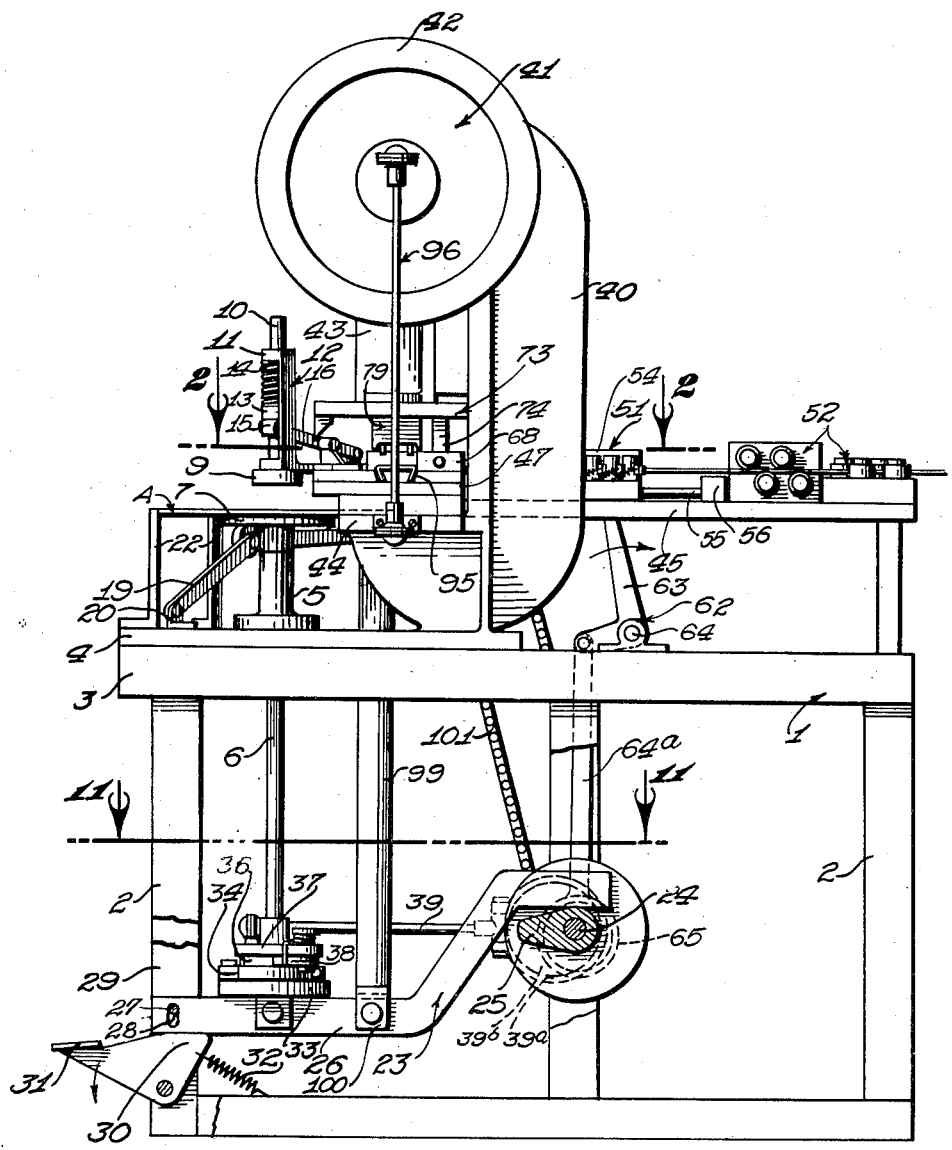
Figure 1 is a side elevational view of my stapling machine with parts and portions broken away.
Figure 7:
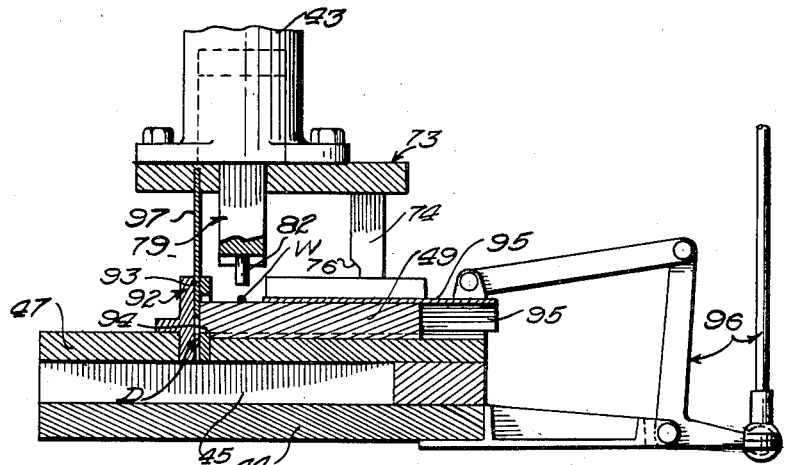
Figure 7 is a fragmentary transverse sectional view taken through 7—7 of Fig. 2 showing particularly the device for moving the staple from the forming mechanism.
Figures 8, 9:
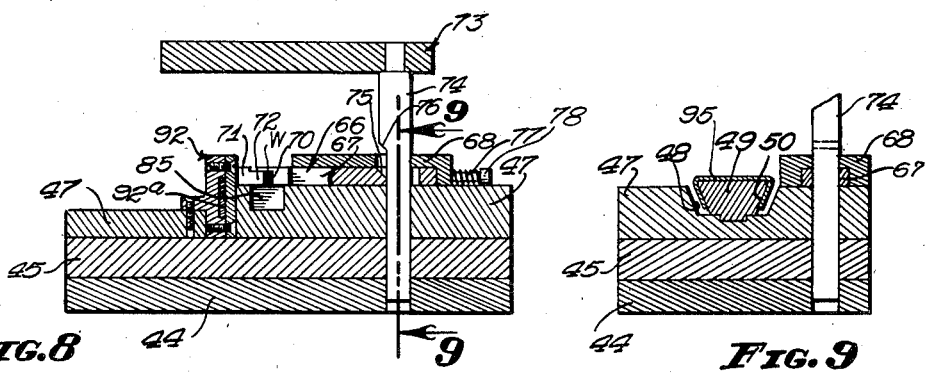
Figure 8 is a similar fragmentary transverse sectional view through 8—8 of Fig. 2 illustrating the cutting mechanism.
Figure 9 is a fragmentary sectional view through 9—9 of Fig. 8.

The hamper lid, designated A, for which the present stapling machine is designed, comprises a plurality of wide thin wooden strips B, the ends of which are secured by overlying cross strips C and cut into circular form as shown in Fig. 2. The staples D are formed of lengths of wire, the extremities of which are bent downward to form converging pointed legs E. The staples are positioned radially around the hamper lid and each fastened by one leg which is forced through the lid and crimped as indicated by F in Fig. 17. The extended or remaining leg is in position for engagement by fastening elements of a hamper lid fastening machine such as shown in the forementioned patent.

The various operating parts of the stapling machine are supported by and from a framework 1, comprising uprights 2 which support horizontal parallel disposed side members 3 connected at their ends. Their forward portions support a platform 4 in which is centered an upstanding bearing 5 which receives a vertical shaft 6. The upper end of the shaft supports a disk shaped turntable 7 which is adapted to support the hamper lid A.

The turntable 7 is provided with short pins 8 adapted to aid in holding the hamper lid. In addition, the hamper lid is held from above by a plunger head 9. The head is provided with an upstanding stem 10 guided by bearings 11 provided in the extremity of a bracket 12. The bracket 12 is supported from a die bed to be described hereinafter. The bearings 11 are spaced apart vertically and between them the stem 10 is provided with a collar 13. Between the collar and upper bearing is a spring 14 which tends to hold the plunger down as shown by dotted lines in Fig. 6.

Below the collar 13 is provided a sleeve 15 which is slidable on the stem and attached to one end of a lever 16. Said lever extends substantially radially beyond the periphery of the hamper lid and is fulcrumed intermediate its ends by a boss 17 extending upwardly from the bracket 12. The extended end of the lever is connected to a depending link 18 which is in turn connected to a second lever 19. The lever 19 extends under the turntable past the bearing 5 and is fulcrumed at its far end by a bracket 20 extending upwardly from the platform 4. Under the turntable the lever 19 is provided with a wheel 21 which bears against the underside of the turntable. The foregoing link and lever arrangement causes the plunger head 9 to rise when the turntable 7 is lowered so that a hamper lid may be readily inserted therebetween.

To facilitate positioning of a hamper lid in centered relation on the turntable 7, the platform 4 is provided with three upstanding stops 22 arranged concentrically with respect to the turntable.

In order to place staples at predetermined positions around the periphery of the hamper lid and to turn automatically the lid between each stapling operation, there is provided a turntable operating mechanism 23. Said mechanism includes a shaft 24 suitably supported from the framework 1 intermediate its ends and below the side members 3. Mounted upon the shaft 24 is a cam 25 which is adapted to periodically raise and lower one end of a bar 26 as shown best in Figs. 1 and 11. The bar extends forwardly, or to the left as viewed in Fig. 1, where it is provided with a vertical slot 27 adapted to receive a pin 28 carried by auxiliary uprights 29 forming a part of the framework 1. Below the forward end of the bar 26 there is provided a lifting cam 30 which is suitably associated with a foot lever 31 in such a manner to raise the bar when the foot lever is depressed. A spring 32 may be connected with the cam and foot lever in a manner to raise the foot lever and return the cam to a normal position in which this end of the bar 26 is lowered.

The bar 26 carries a supporting plate 33 disposed coaxially with and below the shaft 6 and which receives the lower end thereof. Said plate 33 is provided with a depending yoke which straddles the bar to permit tilting thereof. Secured to the shaft 6 immediately above the plate 33 is a brake drum 34 which is engaged by a suitable brake means 35 to retard movement of the shaft 6.

Above the brake drum 34 and likewise secured to the shaft 6 is a ratchet wheel 36 having ratchet teeth equal in number to the staples to be secured in the hamper lid, in this case four such staples are used. A rocker arm 37 is journaled intermediate its ends on the shaft 6 above the ratchet wheel 36. One extremity of the arm carries a pawl 38 while the other end is provided with a ball fitting for connection to an operating rod 39. Said rod extends rearwardly and is hinged to a ring 39a which journals about an eccentric 39b secured to the shaft 24.

With each turn of the shaft 24 the bar 26 is raised once and the shaft 6 is given one quarter turn in a predetermined sequence. The position of the shaft with respect to the cams 25 and 30 and their relative lifts are such that when the cam 30 alone is raised, the shaft places the turntable in an intermediate position at which the turntable is free to rotate. Thereupon action of the cam 25 raises the shaft 6 further for a stapling operation upon the hamper lid to be described hereinafter.

Suitably supported from the side members 2 of the framework 1 behind the platform 6 are a pair of upstanding frame members 40 having forwardly overhanging upper extremities which carry a suitable punch press operating mechanism 41, such as a shaft provided with an eccentric or crank throw not shown, a flywheel 42 and a suitably guided plunger 43.

Below the operating mechanism 41 the frame members 40 are provided with forwardly directed bracket portions which support a base plate 44 extending transversely and under the rear side of a hamper lid positioned on the turntable 7 as shown in Fig. 1. The base plate supports the forward end of a table 45 which extends rearwardly between the frame members 40 and is supported at its back end by posts 46 extending upwardly from the framework 1. The forward end of the table 45 is cut away to receive the hamper lid.

A die bed 47 is mounted upon the forward end of the table and overhangs the base plate 44 and hamper lid. Said die bed is provided with a channel 48 which extends transversely with respect to the framework 1 with its axis in a plane substantially tangent to the periphery of the hamper lid. Said channel receives a mandrel 49 in the form of a bar having downwardly converging sides 50. The channel 48 is wider than the mandrel and its sides slope in conformity thereto.

It should be noted that the axis of the turntable is slightly offset with respect to the longitudinal axis of the framework 1 and table 45 as shown best in Fig. 2. The mandrel 49 extends across the axis of the table 45 to a plane through the axis of the turntable paralleling said table axis.

Figure 10:
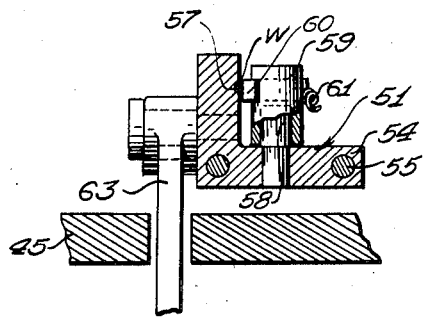
Figure 10 is a further enlarged fragmentary sectional view through 10—10 of Fig. 2 illustrating the wire feeding mechanism.

A wire feeding mechanism 51 is arranged along the axis of the table 45 and receives a continuous strand of wire W from a suitable wire straightening die 52 disposed at the back end of the table 45. The wire feeding mechanism includes a fixed block 53 and a traveling block 54 both of L-shaped section. The traveling block 54 is slidably mounted on two rods 55 supported at their forward ends in the fixed block and at their rear ends in a boss 56. The upstanding legs of the blocks 53 and 54 are provided with coaxial registering channels 57 along which the wire W is adapted to slide. Each block is provided with a series of upwardly extending journal pins 58 which journal and are capped by revoluble feeding finger supports 59 as shown best in Fig. 10.

Each support 59 receives a feeding finger 60 in the form of a pointed bar extending forwardly and laterally through the support in such a manner that its pointed end is engageable with the wire W as shown in Fig. 2. Each finger is yieldably held in engagement with the wire by a spring 61. The several fingers permit forward movement of the wire but prevent return movement thereof. Thus the forward or fixed block 53 holds the wire from returning while the sliding or traveling block 54 moves backwardly to obtain a new "bight" on the wire; then upon forward movement of the traveling block, the wire is fed forwardly therewith a fixed length.

Movement of the traveling block 54 may be accomplished by any suitable link and lever arrangement 62. As shown in Fig. 1 and Fig. 11, this may include a bell crank 63 journaled on a cross shaft 64 extending between the side frame members 2. Said bell crank is provided with a longer upwardly extending arm which is pivotally connected to the traveling block 54 and a horizontally extending shorter arm which is attached to the upper end of a connecting rod 64a, the lower end of which is operated from the drive shaft 24 by means of an eccentric 65.

The wire W is adapted to be fed forwardly across the mandrel 49 from the fixed block 53. Between the block and mandrel there is provided a wire cutter 66 shown best in Figs. 2, 4, 8, and 9. Said wire cutter comprises a body member 67 which extends parallel with the mandrel 49 and is supported by the die bed 47. The body member is mounted within a guide frame 68 secured to the die bed and protrudes therefrom across the axis of the table 45. Here, the body member is provided with horizontal aperture 69 therethrough arranged to receive the wire W. At the extremity of the aperture toward the mandrel, the body member is undercut forming a shear surface 70 which slopes downwardly and rearwardly at an acute angle with respect to the axis of the wire. A short distance beyond the end of the body member is mounted a stop 71 having at its forward corner a triangular shaped boss 72, the upper side of which forms a fixed shear surface adapted to be traversed by the shear surface 70 and sever a wire protruding from the aperture 69.

The plunger 43 of the punch press operating mechanism 41 carries an operating head 73 in the form of a relatively heavy plate. Said operating head carries a cam bar 74 which extends downwardly therefrom through a slot provided in the guide frame 68, die bed 47 and parts below, as shown best in Fig. 8. The body member 67 is likewise slotted to receive the cam bar 74 and the side of the slot toward the operating end of the body member is beveled to form a cam follower surface 75. The corresponding side of the cam bar 74 is provided with a cam shoulder 76 adapted to engage the surface 75 and urge the body member in the direction to sever the wire. Return movement is obtained by a spring 77 which is mounted on a pin 78 extending from the body member 67 through the guide frame 68.

Very little movement is required for the operation of the wire cutter 66. The severed end of the wire is held from lateral movement by the extremity of the boss 72.

The operating head 73 receives a bending die 79, the lower end of which is rectangular in section and the upper end of which is cylindrical and extends through the operating head into a recess formed in the lower end of the plunger 43 as shown best in Fig. 4. The bending die 79 is capable of limited vertical sliding movement and is held down by a strong spring 80. The lower end of the bending die conforms to the top of the mandrel with short depending bending lugs 81 at its extremities adapted to overhang the margins of the mandrel. The bending die is mounted over the path of the wire W and when lowered the lugs 81 are adapted to engage the overhanging lengths of the wire and bend them downward as shown in Fig. 13.

The bending die 79 is provided inwardly of each lug 81 with a small vertically extending bore constricted at its lower end and adapted to receive a small wire holding pin 82 having an enlarged head within the bore held downwardly by a stiff spring 83 which parallels the spring 80 and extends upwardly into the recess 43a. The wire holding pins 82 extend below the bending die and are adapted to engage the wire fed across the mandrel just before operation of the wire cutter 66 as shown best in Fig. 12.

The channel 48 in which the mandrel 49 is positioned is intersected by slots 84 disposed in the plane of the wire W on opposite sides of the mandrel 49. Each slot 84 is adapted to receive a slide bar 85 having a final bending die face 86 confronting the corresponding side of the mandrel 49. Said die face 86 conforms to the side of the mandrel and is adapted to bend into engagement therewith a leg E of the staple which has been previously bent to a vertical position by the initial bending die 79. The other extremity of each slide bar 85 is provided with a beveled cam follower surface 87 which is engageable by a cam lug 89 depending from the operating head 73. Two such cam lugs are so arranged that when the operating head descends further after the bending die has functioned, they urge the slide bars 85 inwardly toward the sides of the mandrel and complete the bending operation on the staple.

Return movement of each slide bar 85 is accomplished by means of a pin 90 which extends outwardly from the follower surface through an end plate 91 covering the extremity of the slot 84. A head is provided on the pin and a spring 91a is positioned between said head and the end plate 91.

In the plane of the axis of the turntable 7, which, as stated hereinbefore, is offset with respect to the axis of the table 45 and the wire W, the die bed 47 is provided with a slot. Said slot receives a guide member 92 which in turn defines a vertically extending staple feeding slot 93 of sufficient length and thickness to receive a staple. Said slot 93 is intersected laterally by an aperture 94 which is partially filled by the end of the mandrel 49 so that the staple formed thereon may be fed along the mandrel and into the slot 93 for vertical downward movement therein. The staple is held in the slot 93 by means of yieldable fingers 92a mounted in recesses at the ends of the slot 93 as shown best in Fig. 5.

The staples are fed from the mandrel to the slot 93 by a slide shield 95 fitted over the mandrel and extending clear of the operating head. Here the slide shield 95 is suitably connected by a link and lever means 96 with the punch press operating mechanism 41.

Fitted in the staple feeding slot 93 is a staple driving plate 97 which is secured in the operating head 73. The driving plate raises sufficiently to clear the mandrel so that a staple may feed thereunder.

The driving plate is adapted to force a staple downwardly in such a manner that one leg thereof is driven through the margin of the hamper lid. In order to crimp or clinch this leg a crimping or clinching die 98 is fitted in the base plate 44. Said clinching die 98 is supported upon the upper end of a connecting bar 99 which extends downwardly and is provided at its lower end with a yoke 100 which straddles the bar 26 of the turntable operating mechanism. The clinching die is raised with the turntable so as to bear against the underside of the hamper lid when the lid is raised but adapted to clear the lid when it is lowered to its intermediate or lower position.

The punch press operating mechanism 41 is connected to the shaft 24 of the turntable operating mechanism 23 by any suitable means such as a chain drive 101 so that the shaft 24 turns once for each reciprocation of the operating head 73 carried by the punch press operating mechanism.

Operation of my stapling machine is as follows:

While the foot lever 31 is in its raised position and the turntable occupies its lower position; a hamper lid is slipped on the turntable and centered. The foot lever 31 is then depressed, partially raising the hamper lid so that action of cam 25 will cause the turntable to move between an intermediate position and an upper position as indicated by the two sets of dotted lines in Fig. 6. In either of these positions, the plunger head 9 is held in yielding engagement with the hamper lid and the pins 8 secure the hamper lid so as to rotate with the turntable.

The wire feeding mechanism 51 is so timed that a length of wire sufficient to form the staple blank is fed through the wire cutter 66 and over the mandrel during the interval that the bending die 79 and its holding pins 82 are clear thereof. Thereupon, the operating head 73 descends until the holding pins 82 engage the staple blank and as the operating head continues down, but before the bending die 79 functions, the wire cutter 66 severs the staple blank, this being depicted in Fig. 12. Continued downward movement of the operating head 73 causes the bending die 79 to bend the extremities of the staple blank to a vertical position and form the legs E as shown in Fig. 13. Still further downward movement of the operating head causes the cam lugs 89 to actuate the slide bars 85 and bend the legs E inwardly against the sides of the mandrel, as shown in Fig. 14.

The operating head 73 then raises and as soon as the holding pins 81 are clear the slide shield 95 moves the staple into the staple feeding slot 93. During the subsequent descent of the operating head and the forming of a new staple, the previously finished one is forced downward by the driving plate 97 as shown in Fig. 16 and one leg is forced through the margin of the hamper lid. Before the staple engages the hamper lid, the turntable has been raised by its operating mechanism 23 until the hamper lid is against the under side of the die bed 47. Also the clinching die 98 is raised so that the leg of the staple is clinched into the hamper lid as shown in Fig. 17.

As the operating head is rising, the turntable lowers to its intermediate position and is rotated a quarter turn so that the hamper lid is positioned for the next staple. The foot lever 31 is held down by the operator until four staples have been delivered whereupon the turntable is lowered further, the finished hamper lid removed and a new one inserted. If desired, a suitable clutch mechanism may be associated with the foot lever so that the punch press operating mechanism and turntable elevating mechanism may be disconnected from the source of power, not shown, whenever the foot is removed from the foot lever.

It should be noted that the wire cutter forms beveled points on the staple, the planes of which are at right angles to the plane of the staple and sloping inwardly in one case and outwardly in the other. The points are therefore symmetrical with respect to the staple and do not tend to veer off laterally as the staple is being driven so that the staple drives straight both during the clinching operation performed by this machine as well as the lidding operation accomplished in the forementioned Patent Number 1,944,254.

Though I have shown and described a particular embodiment of my invention I do not wish to be limited thereto but desire to include in the scope of my invention the constructions, combinations and arrangements as set forth in the appended claims.

I claim:

1. In a stapling machine for hamper lids; a staple forming mechanism including means for cutting a staple blank and means for forming a double ended staple therefrom, means for converging the ends thereof; a staple blank driving mechanism; a clinching means therefor engageable with one end only of said staple; and means for feeding said staples individually from said forming mechanism to said driving mechanism.

2. In a stapling machine for hamper lids; a staple forming mechanism including means for bevel cutting a staple blank and means for forming a double leg staple therefrom, and means for converging the legs thereof; a staple driving mechanism; a clinching means therefor engageable with one leg only of said staple; a common operating means for said mechanisms; and a device connected with said operating means for feeding said staples as formed from the forming mechanism to said driving mechanism between operations thereof.

3. In a stapling machine for hamper lids; a staple forming mechanism including means for cutting a staple blank and means for forming a double leg staple therefrom, and means for converging the legs thereof; a staple driving mechanism; a clinching means therefor engageable with one leg only of said staple; and a hamper lid holding means adapted to position a hamper lid with its margin between said clinching means and staple driving mechanism and intermediate the extremities of the staple whereby said one leg only of the staple is clinched in the hamper lid.

4. In a stapling machine for hamper lids; a staple forming mechanism including means for cutting a staple blank and means for forming a double leg staple therefrom, means for converging the legs thereof; a staple driving mechanism; a clinching means therefor engageable with one leg only of said staple; a common operating means for said mechanisms; a device connected with said operating means for feeding said staples as formed from the forming mechanism to said driving mechanism between operations thereof; a hamper lid holding means adapted to position a hamper lid with its margin between said clinching means and staple driving mechanism and intermediate the extremities of the staple wherby said one leg only of the staple is clinched in the hamper lid.

5. In a hamper lid stapling machine: a wire feeding device; means for cutting said wire on a bevel to form a pointed staple blank; a mechanism for bending the extremities of said blank in a plane perpendicular to the cutting plane of said means whereby the points of said staple when bent are symmetrical with respect to the plane defined by the staple; a staple securing means arranged to receive staples from said mechanism, said securing means engageable with one end of said staple; and a hamper lid holding and turning means arranged to present the periphery of a hamper lid to said securing means.

6. In a hamper lid stapling machine: a staple forming means comprising; a wire feeding device, means for cutting the wire to form a pointed staple blank, and mechanism for bending the wire perpendicularly to the cutting plane of said means whereby the points of said staple when bent are symmetrical with respect to the plane of the staple; a staple securing means arranged to receive staples as formed from said forming means; mechanism common to said securing means and forming means for operating the same periodically; a hamper lid support arranged to present the periphery of a hamper lid to said securing means; and a device associated with said operating mechanism for shifting said support and hamper lid a predetermined distance between operations of said securing means.

7. In a machine for forming double pointed staples and securing them in radial protruding relation around the periphery of a circular hamper lid; a hamper lid gripping means; an operating means therefor including a manual control for releasing the gripping means and facilitate insertion and removal of a hamper lid therefrom, and means for turning said gripping means and hamper lid periodically; a staple forming means including means for bevel cutting a staple blank, a staple former adapted to bend said blank into a double pointed staple and incorporating elements for converging the ends thereof; a staple securing means including a device for positioning staples in radial relation with and protruding from the hamper lid carried by said gripping means, and clinching means engageable with one of the pointed ends of said staples for securing the staples thereby to said hamper lid a feeding element for feeding staples as formed from said staple forming means to said staple securing means; and a driving mechanism common to said staple forming means, staple securing means and feeding element and operatively associated with said hamper lid turning means.

8. In a staple forming machine; a wire feeding device; a mandrel adapted to receive the end of a length of wire delivered from said feeding device; a bending die associated with said mandrel; yieldable wire retainers interposed between said bending die and mandrel; a cutting device for said wire positioned between said mandrel and feeding device; means operable upon engagement of said retainers with the wire for actuating said cutting device; and means for operating said bending die upon cutting of said wire to bend the extremities of its severed end over said mandrel.

9. In a stapling machine: a staple forming means, including a fixed mandrel having converging sides, and forming die elements arranged to shape a staple blank in conformity therewith and form a double pointed staple with converging legs; ejecting means movable laterally to remove the staple from the mandrel; and a staple driving means including a guide element arranged to receive a staple from said ejecting means, a staple driving member arranged to drive a staple through said guide element, and a clinching element coacting with said driving member.

10. In a stapling machine for hamper lids: a hamper lid positioning means: a staple forming means, including a fixed mandrel having a substantially flat top and converging sides; means for positioning a staple blank over said mandrel with its ends protruding, and forming die elements arranged to shape a staple blank with its ends converging in conformity with the sides of said mandrel; ejecting means movable laterally to remove the staple from the mandrel; and a staple driving means including a staple guiding element for disposing a staple in radial relation with the hamper lid and partially projecting beyond the periphery thereof, and coacting clinching devices for securing the staple to the hamper lid.

11. In a stapling machine: a combined staple shaping mandrel and delivery track having converging sides; means for bending a staple in conformity with said mandrel whereby the ends thereof converge and thereby are retained on said mandrel; an ejecting means for urging staples as formed along said mandrel; a staple guide adapted to receive staples from said mandrel; and coacting staple driving and clinching means operable on staples in said guide.

12. In a hamper lid stapling machine: means for bevel cutting a length of wire successively to form bevel pointed staple blanks, said bevel points occupying parallel planes; a staple blank bending means including a holding element engageable with the mid portion of said staple, and bending elements for bending the ends of said staple blank through arcs greater than ninety degrees and in a common plane perpendicular to said bevel points to form converging staple legs having points symmetrical with respect to the axis of said staple.

13. In a hamper lid stapling machine: means for bevel cutting a length of wire successively to form bevel pointed staple blanks said bevel points occupying parallel planes; a staple blank bending means including a holding element engageable with the mid portion of said staple, and bending elements for bending the ends of said staple blank through arcs greater than ninety degrees and in a common plane perpendicular to said bevel points to form converging staple legs having points symmetrical with respect to the axis of said staple: a coacting staple driving and clinching means operable on one leg only of said staple; and a hamper lid holding means adapted to position a hamper lid with its margin interposed between said driving and clinching means and terminating intermediate the extremities of the staple whereby upon operation thereof said staple is clinched by one leg only in said hamper lid; and a device for feeding said staples as formed from said bending means to said driving means.

HENRY M. KINSLOW.